May 16, 1967  M. O. GROAT  3,319,323
JIG FOR MAKING AND ASSEMBLING SEPARATE GABLE SECTIONS
Filed June 3, 1965  3 Sheets-Sheet 1
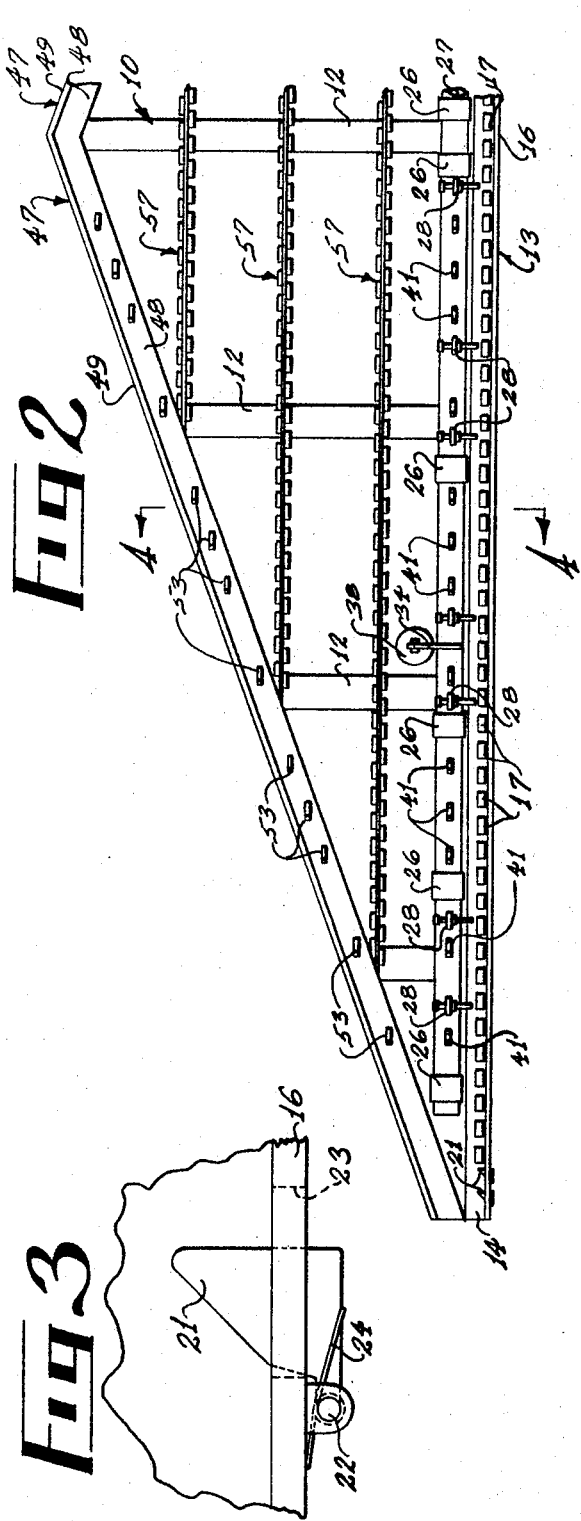
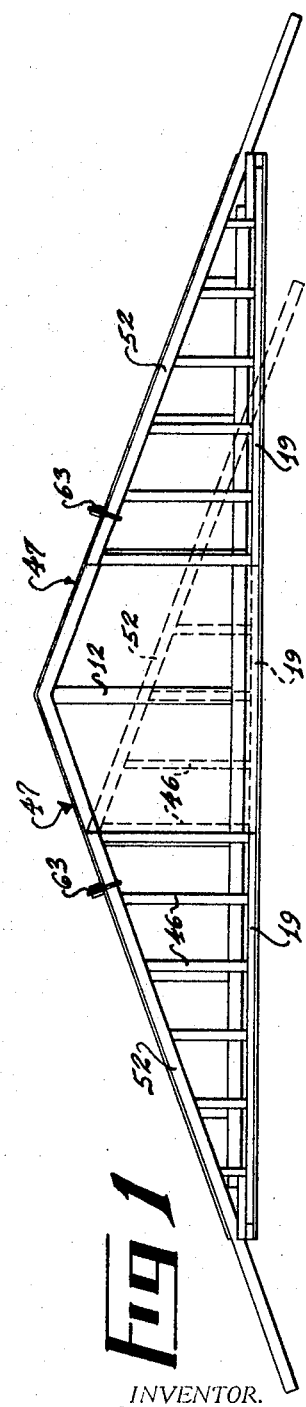
INVENTOR.
Marshall O. Groat
BY
Jennings Carter + Thompson
Attorneys

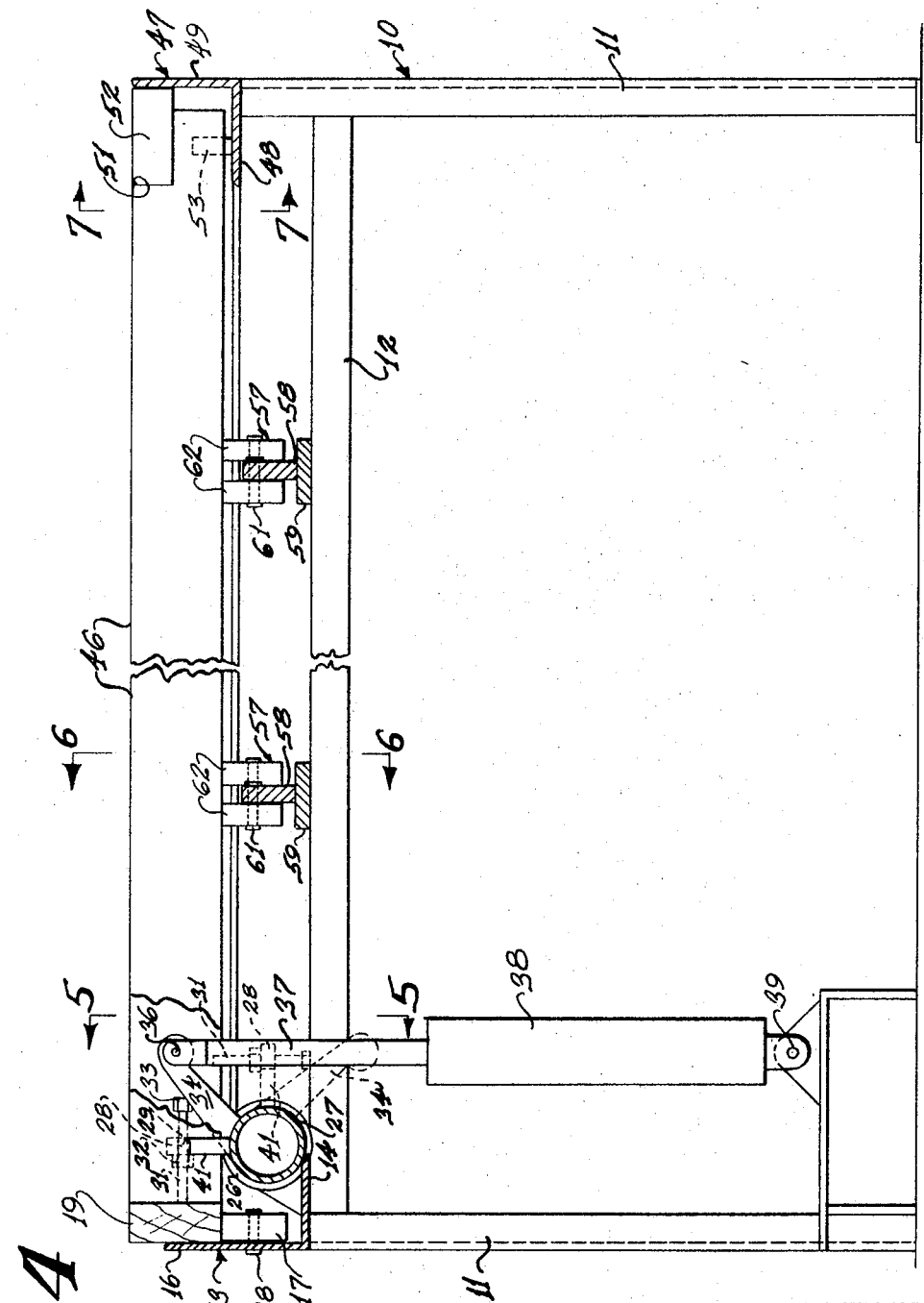

May 16, 1967 M. O. GROAT 3,319,323
JIG FOR MAKING AND ASSEMBLING SEPARATE GABLE SECTIONS
Filed June 3, 1965 3 Sheets-Sheet 3

INVENTOR.
Marshall O. Groat
BY
Attorneys

United States Patent Office 3,319,323
Patented May 16, 1967

3,319,323
JIG FOR MAKING AND ASSEMBLING
SEPARATE GABLE SECTIONS
Marshall O. Groat, Fort Payne, Ala., assignor to Kingsberry Homes Corporation, a corporation of Delaware
Filed June 3, 1965, Ser. No. 461,068
11 Claims. (Cl. 29—200)

This invention relates to a gable jig and more particularly to a jig for making separate sections of a gable which may be assembled and secured to form a composite gable.

Another object of my invention is to provide a gable jig which shall be particularly adapted for use in prefabrication of gables for prefabricated buildings.

Another object of my invention is to provide a gable jig of the character deignated which shall be adapted to produce gables of different sizes, having the same rafter pitch thus permitting gables to be built without making any changes in the jig size or jig stops and fixtures whereby there is a substantial saving in set up time over that normally required on conventional gable jig tables.

A further object of my invention is to provide a gable jig of the character designated which shall be simple of construction, economical of manufacture and one which may be employed by semiskilled labor to produce gables which are uniform and accurate in all dimensions.

Briefly, my improved gable jig comprises a gable plate support and positioning member and a pair of gable rafter support and positioning members which extend at an angle to each other and to the gable plate support and positioning member. Releasable clamping means is provided to clamp the gable plates of separate sections of a gable to the gable plate support and positioning member. Stud positioning members are mounted in position to engage and align the studs to be connected to the gable plate and the rafters of the separate sections and means is provided to support at least one of the separate sections of the gable for movement toward the other section for assembly.

A gable jig embodying features of my invention is illustrated in the accompanying drawings, forming a part of this application, in which:

FIG. 1 is a top plan view of the jig showing the separate sections of a gable therein;

FIG. 2 is an enlarged, fragmental view showing one side of the gable jig, the gable section being omitted, for the sake of clarity;

FIG. 3 is an enlarged, fragmental view showing the releasable stop member carried by the gable plate support and positioning member;

FIG. 4 is an enlarged, sectional view taken generally along the line 4—4 of FIG. 2;

Figure 5:
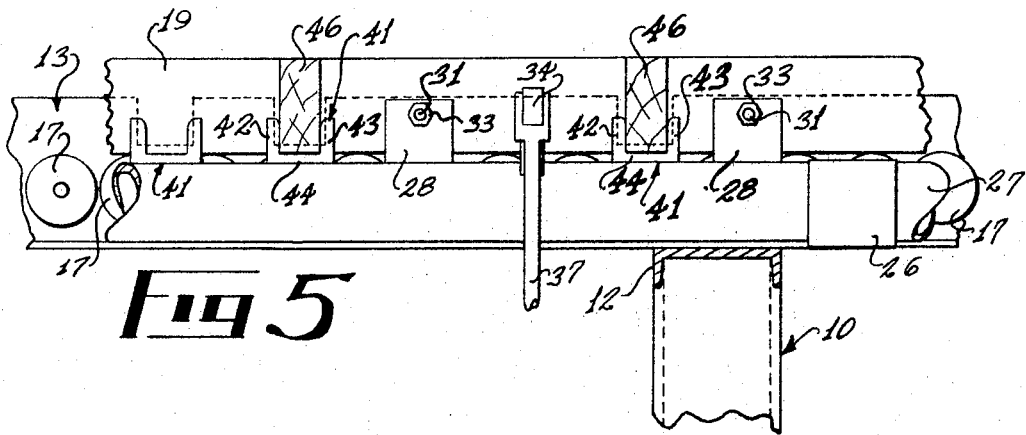
FIG. 5 is a fragmental view taken generally along the line 5—5 of FIG. 4.

Referring now to the drawings for a better understanding of my invention, I show a supporting frame 10 having vertical legs 11 and a series of transverse members 12 which extend in a horizontal plane, as shown. Mounted at one side of the frame 10 and extending in a horizontal plane is a gable plate support and positioning member 13. As shown in FIG. 4, the member 13 is generally L-shaped, as viewed in cross section, to provide a lower horizontal flange 14 and an upstanding vertical flange 16. Mounted for rotation along the inner surface of the vertical flange 16 is a horizontal row of rollers 17 which are supported by suitable support pins 18 carried by the vertical flange 16. That is to say, the upper surface of the rollers 17 extend in a common horizontal plane in position to engage the under surface of a gable plate 19. The inner surface of the vertical flange 16 engages the outer surface of the gable plate 19 whereby outward movement of the gable plate is limited.

To limit longitudinal movement of the gable plate 19 relative to the gable plate support and positioning member 13, releasable stop members 21 are pivotally mounted by suitable pivot pins 22 on the vertical flange 16, as shown in FIGS. 2 and 3. Suitable openings 23 are provided in the vertical flange 16 for receiving the stop members whereby they are adapted to move from a position inwardly of the flange 16 to an inoperative position outwardly of the flange 16. A torsion spring 24 surrounds the pin 22 and engages the under surface of the stop member 21 and the side of the vertical flange 16, as shown in FIG. 3, whereby each stop member is urged toward operative position inwardly of the vertical flange 16. By providing two releasable stop members 21, the overall length of the gable plate 19 may be varied. That is, by depressing the innermost stop member 21, the end of the gable plate would engage the outermost stop member 21. While I have shown two stop members 21, it will be apparent that only one stop member 21 may be employed, if desired.

Mounted on the horizontal flange 14 of the gable plate support and positioning member 13 at longitudinally spaced intervals are sleeve-like bearing members 26. Mounted for rotation within the bearing members 26 in an elongated member 27 which may be in the form of a tube. As clearly shown in FIGS. 2 and 4, the elongated member 27 extends alongside and parallel to the vertical flange 16. Secured to the elongated member 27 at longitudinally spaced intervals are outwardly projecting members 28 having threaded openings 29 through outer portions thereof which are disposed to receive threaded members 31. To hold the threaded members 31 in selected positions relative to the outwardly projecting members 28, lock nuts 32 engage the threaded members 31 adjacent the outwardly projecting members 28, as shown. A suitable head 33 is provided on each of the threaded members 31 whereby the threaded member may be rotated relative to the outwardly projecting member 28. The end of the threaded member 31 is adapted to engage the inner surface of the gable plate 19 whereby the threaded members 31 form releasable clamping members which hold the gable plate 19 firmly in place while it is supported on the rollers 17.

Secured to the elongated member 27 and projecting outwardly thereof is an arm 34. The outer end of the arm 34 is pivotally connected by a pivot pin 36 to the upper end of a piston rod 37 of a fluid pressure operated cylinder 38. The lower end of the cylinder 38 is pivotally connected to the supporting frame 10 as at 39. When the arm 34 is in the solid line position shown in FIG. 4, the clamp members 31 are in contact with the inner surfaces of the gable plates 19 to thus clamp the same in place. On the other hand, upon actuating the fluid pressure operated cylinder 38 to move the arm 34 to the lower or dotted line position shown in FIG. 4, the outwardly projecting member 28 moves to a horizontal position whereby the threaded clamp members 31 are out of engagement with the gable plate 19. Accordingly, upon rotating the elongated member 27 in opposite directions by the fluid pressure operated cylinder 38, each clamp member 31 is moved selectively from operative or clamping position to an inoperative position.

Mounted on the elongated member 27 at longitudinally spaced intervals are a plurality of stud positioning members 41 which are preferably U-shaped, as shown in FIG. 5. The U-shaped members 41 are thus provided with upstanding legs 42 and 43 and a base portion 44 which is secured rigidly to the elongated member 27. The legs 42 and 43 are spaced from each other a distance to receive a stud 46 therebetween, as shown in FIG. 5. As shown in FIG. 2, the U-shaped stud positioning members 41 are in alignment with the outwardly projecting members 28 whereby upon moving the arm 34 to the solid line position shown in FIG. 4, the stud positioning members 41 are in position to receive the studs 46. On the other hand, when the arm 34 is moved to the dotted line position shown in FIG. 4, the U-shaped stud positioning members 41 are moved to an inoperative position whereby the legs 42 and 43 extend in a generally horizontal plane. It will thus be seen that upon movement of the clamping members 31 into operative position, the stud positioning members 41 are also moved into operative position for receiving the studs 46.

Figure 7:
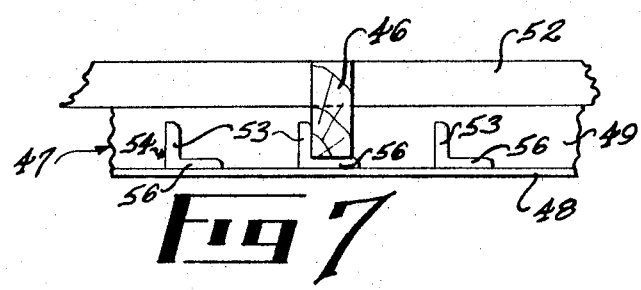
FIG. 7 is a fragmental view taken generally along the line 7—7 of FIG. 4.

Mounted on the supporting frame 10 at the opposite side thereof from the gable plate support and positioning member 13 are a pair of gable rafter support and positioning members 47 which are positioned at a predetermined angle relative to each other and relative to the gable plate 19. As shown in FIG. 4, each rafter support and positioning member 47 is generally L-shaped, as viewed in cross section, to provide a horizontal flange 48 and a vertical flange 49. The end of each stud 46 is provided with the usual cut-away portion 51 for receiving a rafter 52. Accordingly, the rafter 52 is supported within the cut-away portion 51 and outward movement thereof is limited by the vertical flange 49 of the rafter support and positioning member 47. A plurality of upstanding stud positioning members 53 are carried by the horizontal flange 48. Preferably, the upstanding stud positioning member 53 comprises a vertical leg of an L-shaped member 54 having its horizontal flange 56 secured rigidly to the horizontal flange 48, as shown in FIG. 7. Each stud 46 is positioned on the inner side of its associated stud positioning member 53 whereby the stud is free to move inwardly of the gable jig.

Figure 6:
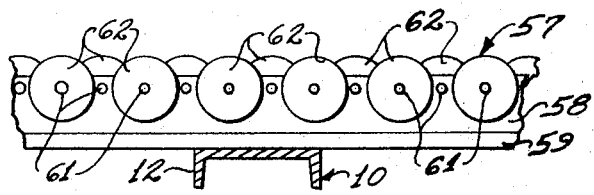
FIG. 6 is a fragmental view taken generally along the line 6—6 of FIG. 4.

Mounted on the transverse members 12 and extending in parallel, spaced relation to each other and the gable plate support and positioning member 13 are a plurality of aligned rows of supporting rollers 57. Each aligned row of rollers 57 comprises an upstanding support member 58 which is connected to a horizontal base member 59 which in turn is rigidly secured to the transverse members 12, as shown in FIGS. 4 and 6. Secured to opposite sides of the vertical member 58 in staggered relationship to each other are a plurality of supporting pins 61 which support rollers 62. As shown in FIG. 6, the upper surfaces of the rollers 62 lie in a common horizontal plane in position to engage the under surface of the studs 46 whereby the completed sections of the gable are adapted for movement inwardly of the gable jig.

The rafters 52 are secured to the gable rafter support and positioning members 49 by suitable clamp members 63 which limit longitudinal movement of the rafters relative to the gable rafter support and positioning members 47. The rafters 52 are thus firmly held in place by the clamps 63 between the vertical flange 49 and the cut-away portion 51.

From the foregoing description the operation of my improved gable jig will be readily understood. The gable plates 19 are positioned at opposite ends of the gable plate support and positioning member 13 whereby the inner ends thereof are in spaced relation to each other, as shown in FIG. 1. The gable plates 19 are thus supported on the rollers 17 and outward movement thereof is limited by the vertical flange 16.

The fluid pressure operated cylinder 38 is actuated to move the arm 34 from the dotted line position shown in FIG. 4 to the solid line position whereupon the clamping elements 31 move into engagement with the inner surfaces of the gable plates 19. With the arm 34 in the solid line position shown in FIG. 4, the U-shaped stud positioning members 41 are in position for the vertical legs 42 and 43 thereof to engage opposite sides of studs 46 which are positioned across the aligned rows of rollers 57, as shown in FIG. 4. The end of each stud 46 opposite the end thereof engaging the stud positioning members 41 engages the upstanding stud positioning member 53 carried by the rafter support and positioning members 47 whereby the stud is positioned accurately relative to the gable plates and gable rafters. With the studs 46 thus positioned, the rafters are placed within the cut-away portions 51 whereby the outer surface of the rafters engage the vertical flanges 49 of the rafter support and positioning members 47. The rafters 52 are then clamped in place by the rafter clamps 63 whereby longitudinal movement of the rafters is limited. The gable plates 19 are then secured to the adjacent ends of the studs 46 by nails and the rafters 52 are secured to the opposite ends of the studs by nails. The fluid pressure operated cylinder 38 is then actuated to move the arm 34 from the solid line position to the dotted line position shown in FIG. 4 whereupon the clamp elements 31 move out of engagement with the gable plates 19. Also, the U-shaped stud positioning members 41 rotate to a generally horizontal position beneath the studs 46 whereby the studs are released. The rafter clamps 63 are also removed whereby the separate sections of the gable at opposite ends of the gable jig are adapted for inward movement relative to each other. That is, with the apparatus shown in FIG. 1, the section of the gable at the right hand side of the jig is moved inwardly to the dotted line position whereby it abuts the adjacent end of the other section of the gable. The two abutting sections are then nailed together whereby the composite gable is completed and is ready for the application of an exterior finish.

From the foregoing, it will be seen that I have devised an improved gable jig for producing gables of various sizes which have the same pitch or roof angle. By providing a gable jig wherein the separate sections of the gable may be formed adjacent opposite ends thereof and then moved inwardly into abutting relation with each other, the entire gable is formed in one jig and at the same time the size of the composite gable may be varied by merely varying the lengths of the gable plates and rafters and the number of stud members employed.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. In a jig for making separate sections of a gable and then bringing the sections together for assembly:
 (a) a supporting frame,
 (b) a gable plate support and positioning member carried by said frame and of a length greater than the length of two gable plates whereby the gable plates of the separate sections may be positioned thereon in spaced relation to each other,
 (c) a pair of gable rafter support and positioning members carried by said frame and extending at an angle relative to each other and relative to said gable plate support and positioning member with each rafter support and positioning member being of a length greater than the length of a rafter whereby the rafters of the separate sections supported on said rafter support and positioning members may be positioned in spaced relation to each other,
 (d) releasable clamping means carried by said frame to clamp the gable plates of the separate sections to said gable plate support and positioning member in spaced relation to each other,

(e) stud positioning members operatively connected to said frame in position to engage and align the studs to be connected to the gable plates and rafters of the separate sections, and (f) a plurality of rollers carried by said gable plate support and positioning member in position to support at least one of said gable plates for movement toward the other gable plate upon release of said releasable clamping means.

2. In a jig for making separate sections of a gable as defined in claim 1 in which the releasable clamping means comprises:

(a) an elongated member mounted for rotation alongside said gable plate support and positioning member, (b) a plurality of longitudinally spaced clamping elements carried by said elongated member, and (c) means to rotate said elongated members to move said clamping elements selectively into and out of engagement with the gable plates.

3. In a jig for making separate sections of a gable as defined in claim 2 in which each clamping element comprises:

(a) an outwardly projecting member carried by said elongated member, (b) there being a threaded opening through the outer portion of said outwardly projecting member, (c) a threaded member in engagement with said threaded opening and disposed to engage a gable plate, and (d) means to retain said threaded member in selected positions relative to said outwardly projecting member.

4. In a jig for making separate sections of a gable as defined in claim 2 in which longitudinally spaced stud positioning members are carried by said elongated member in position to move into and out of engagement with the studs in response to rotation of said elongated member in opposite directions.

5. In a jig for making separate sections of a gable as defined in claim 4 in which each stud positioning member is generally U-shaped with the base thereof secured to said elongated member.

6. In a jig for making separate sections of a gable as defined in claim 1 in which stud positioning members are carried by said gable plate support and positioning member and said gable rafter support and positioning members.

7. In a jig for making separate sections of a gable as defined in claim 6 in which each stud positioning member carried by the gable rafter support and positioning members is generally L-shaped with one leg thereof extending outwardly to limit movement of a stud in one direction.

8. In a jig for making separate sections of a gable as defined in claim 1 in which means is provided intermediate said gable plate support and positioning member and said gable rafter support and positioning members to support the studs of the separate sections of a gable whereby at least one of said sections is adapted for movement relative to the other section thereof.

9. In a jig for making separate sections of a gable as defined in claim 8 in which the means to support the studs comprises rows of aligned rollers disposed to engage the studs as they move thereover.

10. In a jig for making separate sections of a gable as defined in claim 1 in which the gable plate support and positioning member and said gable rafter support and positioning members are generally L-shaped as viewed in transverse cross section.

11. In a jig for making separate sections of a gable as defined in claim 1 in which at least one releasable stop member is carried by said gable plate support and positioning member in position to limit longitudinal movement of the gable plates.

References Cited by the Examiner
UNITED STATES PATENTS

| | | | |
|---|---|---|---|
| 2,500,204 | 3/1950 | Ronay | 29—200 |
| 3,183,581 | 5/1965 | Lister | 29—200 |
| 3,186,071 | 6/1965 | Huff | 29—200 |

JOHN F. CAMPBELL, *Primary Examiner.*

THOMAS H. EAGER, *Examiner.*